United States Patent [19]
Pettipiece

[11] 3,803,512
[45] Apr. 9, 1974

[54] HYDROGEN-FLUORIDE CHEMICAL LASER OSCILLATOR

[75] Inventor: Kenneth J. Pettipiece, Brentwood, Calif.

[73] Assignee: The United States of America as represented by the United States Atomic Energy Commission, Washington, D.C.

[22] Filed: Sept. 29, 1972

[21] Appl. No.: 293,723

[52] U.S. Cl. .............................................. 331/94.5
[51] Int. Cl. ............................................... H01s 3/09
[58] Field of Search .................................. 331/94.5

[56] References Cited
UNITED STATES PATENTS
3,706,942  12/1972  Ultee .............................. 331/94.5
3,725,735  4/1973  Beaulieu et al. .................. 331/94.5
3,509,486  4/1970  Patel ................................. 331/94.5

FOREIGN PATENTS OR APPLICATIONS
984,590  2/1965  Great Britain .................... 331/94.5

Primary Examiner—William L. Sikes
Attorney, Agent, or Firm—John A. Horan; F. A. Robertson; L. E. Carnahan

[57] ABSTRACT

A hydrogen-fluoride chemical laser oscillator capable of producing short timelength (to less than 5 nsec) light pulses in a selected TEM mode. Lasing results from a reaction of flowing gaseous mixtures, such as $SF_6$ and $CH_4$, which produce hydrogen-fluoride, at pressures ranging from about 100 to 350 torr when initiated by an electrical discharge in a resonant optical cavity.

4 Claims, 1 Drawing Figure

PATENTED APR 9 1974
3,803,512
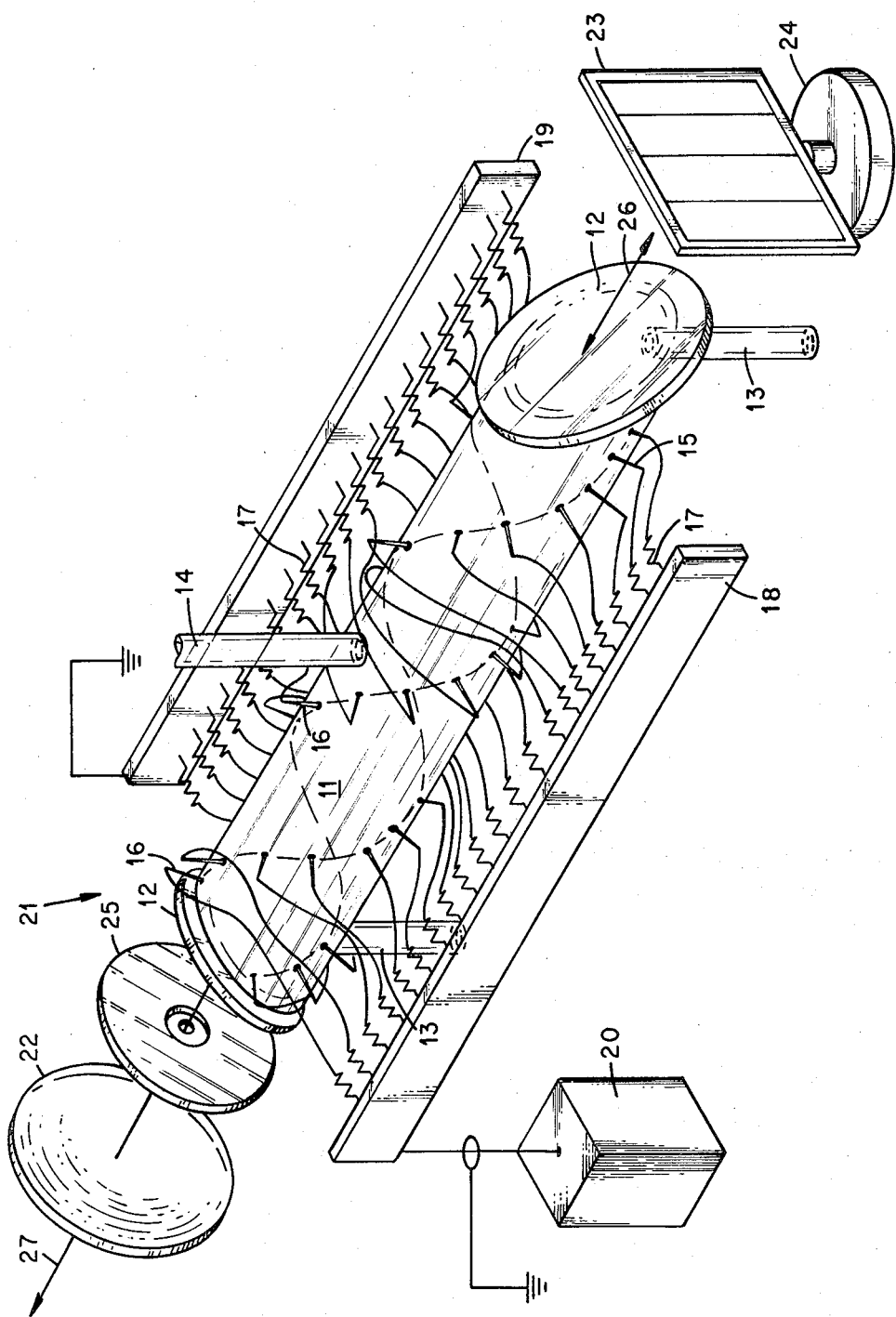

HYDROGEN-FLUORIDE CHEMICAL LASER OSCILLATOR

BACKGROUND OF THE INVENTION

The invention described herein was made in the course of, or under, Contract No. W-7405-ENG-48 with the United States Atomic Energy Commission.

This invention relates to laser oscillators, particularly to hydrogen-fluoride chemical laser oscillators, and more particularly to HF oscillators capable of producing short timelength light pulses at pressures ranging from 100 to 350 torr.

The hydrogen-fluoride (HF) chemical laser system is envisaged as a series of sequential chemical laser amplifier units, wherein a short pulse of stimulating light from a laser oscillator is directed into the amplifier chain to stimulate a high energy light pulse therefrom. The timewidth of the stimulated pulse decreases as it propagates down the chain, due to non-linear amplifying properties of the chemical laser amplifier units. However, to reach the subnanosecond timewidth regime, the introduced stimulating light pulse must have a timewidth less than 5 nanoseconds. Prior known HF chemical laser oscillators produce light pulses with timewidths one order of magnitude too high. Thus, there is a need in the art for an HF chemical laser oscillator capable of stably generating light pulses having timewidths less than 10 nanoseconds.

SUMMARY OF THE INVENTION

The present invention fills the above described need in the art by providing a hydrogen-fluoride chemical laser oscillator capable of producing short timelength light pulses (less than 5 nsec), whereby an HF chemical laser system can produce subnanosecond pulses having energies ranging from 10 to 100 joules. The inventive laser oscillator can be operated in a selected TEM mode, and at pressures ranging from 100 to 350 torr.

Therefore, it is an object of this invention to provide a hydrogen-fluoride (HF) chemical laser oscillator.

A further object is to provide an HF chemical laser oscillator capable of producing short timelength light pulses.

Another object of the invention is to provide an HF oscillator capable of producing short timelength (less than 5 nsec) light pulses in a selected TEM mode.

Another object of the invention is to provide an HF oscillator capable of producing short timelength light pulses from flowing gaseous mixtures at pressures ranging from 100 to 350 torr.

Other objects of the invention will become readily apparent from the following description and accompanying drawing.

BRIEF DESCRIPTION OF THE DRAWING

The single FIGURE illustrates an embodiment of the inventive hydrogen-fluoride chemical laser oscillator.

DESCRIPTION OF THE INVENTION

Broadly, the invention is a hydrogen-fluoride chemical laser oscillator which can stably produce light pulses having timewidths less than 5 nanoseconds FWHM and a peak energy greater than 0.65 millijoules. Lasing results from an electrical discharge initiation of chemical reaction of a gaseous mixture, such as $SF_6$ and $CH_4$ flowing at pressures ranging from 100 to 350 torr through a resonant optical cavity. A transverse electromagnetic, $TEM_{oo}$ mode is promoted by an aperture placed in the resonant cavity. A single longitudinal mode is selected by regulating cavity length.

With reference to the drawing, an embodiment of the inventive hydrogen-fluoride (HF) chemical laser oscillator comprises a glass tube or vessel 11, approximately 30 cm long and 8 mm in diameter, for example, with windows 12 of sapphire, for example, set at Brewster's angle at each end of tube 11. Gas inlets 13, connected to a gaseous lasing media or mixture supply not shown, are provided near each end of the tube 11 and a gas exhaust or outlet 14 is provided near the center of tube 11, such that gas flow sweeps reaction products away from the windows 12. Two helical rows of pins 15 and 16, for example, constructed of tungsten and on 1-cm spacing, project into the volume of tube 11 via rows of apertures on diametrically opposite sides of said tube, and making, for example, one complete revolution in 20 cm, there being 21 sets of such pins in this embodiment. The pins 15 and 16 in each helical row are connected to conductive bars 18 and 19, respectively, through resistors 17. For example, the conductive or bus-bars are constructed of copper and the resistors 17 are 510 ohm. Power supply means 20, such as a Marx capacitor bank, for generating short timewidth, high voltage pulses is connected to conductive bar 18, while conductive bar 19 is connected to ground.

The tube 11 is placed in a relatively short resonant optical cavity indicated generally at 21, defined by a concave partially transmissive output mirror or reflector member 22 and a rear mirror grating or reflector member 23 mounted on a rotatable fixture or support 24. For example, the output mirror 22 is a silicon substrate having a 50 percent reflective coating on a 2-m concave surface inside the cavity 21, and an antireflection coating on a 1.4-m convex surface outside the cavity which provided stability with minimum lens effect. The rear reflector, for example, is a 625-line grating blazed at 61 deg. 10 min. and the rotatable fixture 24 has a graduated scale such that any angular position could be located and returned to within 1 min. of arc, thus allowing location of any desired line. Grating 23 could be replaced with a flat reflector such as gold for example and thus the output pulse would contain all lines in a single pulse. The single pulse containing all lines will extract the energy from the series of sequential chemical laser amplifiers units more efficiently thus making it advantageous to use a flat reflector in this mode of operation. An adjustable diameter iris 25 is aligned with the optical axis of the cavity 21 to provide means for TEM mode selection. Adverse thermal effects on the cavity 21 are minimized by connecting a holding mount (not shown) for mirror 22 and the rotatable fixture 24 with INVAR rods (not shown).

In operation, a gaseous mixture of sulfur hexafluoride ($SF_6$) and methane ($CH_4$) is introduced (continuously or selectively) through inlets 13 into the tube 11 at pressures ranging from 100 to 350 torr. A chemical reaction is initiated between the component gases by a short electrical discharge between the two helical rows of oppositely positioned pins 15 and 16. The chemical reaction produces hydrogen-fluoride, having an excited vibrational energy state appropriate for lasing action. Spontaneous emission from the excited HF is amplified by repeated reflection in the optical cavity 21, as indicated by arrows 26, to produce the output laser light pulse, indicated at 27. The gaseous residue from the chemical reaction is exhausted through outlet 14. For maximum laser output energy, the mixture ratio of $SF_6$ to $CH_4$ should be in the range of 8:1 to 18:1.

In tests conducted on the above-described embodiment of the inventive oscillator the Marx capacitor bank was operated at either 75 or 90 kV, with a pulse width of approximately 70 nsec and an output of 5 joules at the 90 kV power setting. The capacitor bank had the capability of charging and firing from 1 to 25 pulses per second, or on a single-shot basis.

During the testing the reactant gases, $SF_6$ and $CH_4$, were mixed and flowed through the laser tube at pressures ranging from 10 to 350 torr and, as pointed out above at ratios of 1 to 18 $SF_6$ to $CH_4$, wherein it was found that laser output energy increased with increased ratio up to about 8 to 1, then remained about constant to 18 to 1 when tested at 125 torr.

It was discovered that the stimulated light output pulse from the excited hydrogen-fluoride has a characteristic double peak at pressures ranging from 10 to 100 torr. This characteristic double peak pulse is not suitable as a stimulating pulse for a chemical laser amplifier chain because of its timewidth and structure. However, it was discovered that above 100 torr the energy in the second peak began to diminish, reaching zero at 200 torr, while the first peak remained. Moreover, it was found that the timewidth of the remaining peak decreased with increasing pressure. It is believed that this phenomenon is due to the increased collision rate in the reacting gaseous mixture realized when pressure is increased. Specifically, when the pressure of the gaseous reactants was increased from 100 torr to 200 torr, the timewidth of the first peak of the stimulated pulse from HF decreased from above 20 nsec to 5 nsec. At pressures above 200 torr, the timewidth of the produced pulse (first peak) further decreased to less than 3 nsec at 300 torr. Accordingly, it is possible to obtain stimulated light pulse with "good" structure and variable timewidth in the above-described chemical laser oscillator by varying the pressure of the gaseous reactants between about 150 torr to about 350 torr.

Also, in tests conducted on the above-described embodiment of the inventive oscillator, the oscillator produced a stable output with a beam divergence of 1.4 times the diffraction limit while lasing on the four dominant 2 → 1 vibrational transition lines, P(4) –P(7), P(7), a total pressure of 190 torr. The chemical reaction was initiated with an electric discharge of E/P of 700 V/cm torr for maximum energy output.

The resonant optical cavity of the inventive oscillator is kept short to provide lasing in a selected longitudinal mode. In addition, TEM mode selection is promoted by providing the adjustable aperture iris in the resonant cavity.

While the above description has been directed to a gaseous lasing media comprising a gaseous mixture of $SF_6$ and $CH_4$ to produce the reaction hydrogen-fluoride, it is not intended to limit the invention to this specific mixture and it is understood that any mixture capable of producing hydrogen-fluoride which will lase in the timewidth and pressures of the inventive oscillator, such other mixtures being exemplified by composition of $SF_6$ and $H_2$; $SF_6$ and $C_3H_8$; and $CF_4$ and $CH_4$.

It has thus been shown that the present invention provides a hydrogen-fluoride chemical laser oscillator that is operated at pressures ranging from 100 to 350 torr to produce a short (less than 5 nsec) time-width light pulse, and is capable of operating in a selected TEM mode, thereby filling the need in the prior art and thus advancing the state of the art in the chemical laser field.

What I claim is:

1. A hydrogen-fluoride chemical laser oscillator capable of producing time length light pulses of less than 5 nsec and operating in a selected TEM mode comprising: a vessel means defined by an elongated tube-like means, said elongated tube-like means being closed at opposite ends thereof with window means positioned at Brewster's angle, said elongated tube-like means being provided with two helical rows of apertures, one of said rows of apertures being located diametrically opposite the other of said rows of apertures, means for directing gaseous lasing media into and out of said elongated tube-like means consisting of at least a pair of gas inlet means in said elongated tube-like means located at opposite end portions thereof and adjacent said window means, and at least one gas outlet means located in a central portion of said elongated tube-like means such that flow of the gaseous lasing media through said inlet means sweeps reaction products away from said window means, said gaseous lasing media being composed of a gaseous mixture selected from the group consisting of $SF_6$ and $CH_2$, $SF_6$ and $H_2$, $SF_6$ and $C_3H_8$, and $CF_4$ and $CH_4$ under a pressure of about 150–350 torr and which by chemical reaction thereof produces hydrogen-fluoride, means for producing 1 to 25 electrical discharges per second across said elongated tube-like means causing chemical reaction of said gaseous mixture, said electrical discharge producing means including a pair of oppositely positioned helical rows of spaced electrically conductive pin-like means extending through said apertures in said elongated tube-like means, said electrical discharge producing means additionally including a pair of bus-bar means positioned substantially parallel to and on opposite sides of said vessel means, said bus-bar means being electrically connected to said pair of helical rows of electrically conductive pin-like means through a plurality of resistor means, one of said bus-bar means being connected to an electrical power supply, the other of said bus-bar means being connected to ground, reflector means positioned at opposite ends of said elongated tube-like means defining therein an optical resonant cavity, said reflector means comprising a pair of reflector members, one of said reflector members being of a partially transmissive type, and the other of said reflector members being of a grating-type mounted on a rotatable fixture, and an adjustable diameter iris means positioned between one of said window means and one of said reflector means and aligned with an optical axis of said optical resonant cavity providing for $TEM_{oo}$ mode operation of said oscillator.

2. The hydrogen-fluoride chemical laser defined in claim 1, wherein said electrical power supply comprises a capacitor bank.

3. The hydrogen-fluoride chemical laser oscillator defined in claim 1, wherein said gaseous mixture is composed essentially of $SF_6$ and $CH_4$.

4. The hydrogen-fluoride chemical laser oscillator defined in claim 3, wherein said mixture of $SF_6$ and $CH_4$ has a ratio of $SF_6$ to $CH_4$ of at least 8:1.

* * * * *